United States Patent
Inaba et al.

(10) Patent No.: US 10,286,551 B2
(45) Date of Patent: May 14, 2019

(54) ROBOT SYSTEM THAT CONTROLS ROBOT INCLUDING MULTIPLE MECHANICAL UNITS, THE MECHANICAL UNITS, AND ROBOT CONTROL DEVICE

(71) Applicant: FANUC CORPORATION, Yamanashi (JP)

(72) Inventors: Gou Inaba, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 38 days.

(21) Appl. No.: 15/466,378

(22) Filed: Mar. 22, 2017

(65) Prior Publication Data

US 2017/0274528 A1    Sep. 28, 2017

(30) Foreign Application Priority Data

Mar. 24, 2016 (JP) ................. 2016-060931

(51) Int. Cl.
*B25J 9/16*   (2006.01)

(52) U.S. Cl.
CPC ..... *B25J 9/163* (2013.01); *G05B 2219/39082* (2013.01)

(58) Field of Classification Search
CPC .... B25J 9/1666; B25J 9/1676; B25J 19/0004; B25J 9/08; G05B 2219/39082; G05B 2219/40317; G05B 2219/49157; G05B 2219/40339; G05B 2219/39091; G05B 2219/40492; G05B 2219/49145; G05B 2219/34128; G05B 2219/49137; G05B 2219/35148; G05B 2219/49138; G05B 2219/24003; G05B 2219/50198; G05B 2219/41279; G05B 2219/39447; G05B 2219/42284

See application file for complete search history.

(56) References Cited

U.S. PATENT DOCUMENTS

| | | | | |
|---|---|---|---|---|
| 4,578,757 A | * | 3/1986 | Stark | A61B 6/102 250/363.02 |
| 6,708,068 B1 | | 3/2004 | Sakaue | |
| 2004/0128029 A1 | * | 7/2004 | Kato | B25J 9/08 700/245 |
| 2004/0249508 A1 | * | 12/2004 | Suita | B25J 9/1666 700/245 |
| 2005/0055134 A1 | | 3/2005 | Okuda et al. | |
| 2010/0292843 A1 | * | 11/2010 | Kariyazaki | B25J 9/1676 700/264 |

(Continued)

FOREIGN PATENT DOCUMENTS

| CN | 101077579 A | 11/2007 |
|---|---|---|
| CN | 101402202 A | 4/2009 |

(Continued)

*Primary Examiner* — Dale Moyer
(74) *Attorney, Agent, or Firm* — Hauptman Ham, LLP

(57) ABSTRACT

A robot system is provided with a robot including a combination of mechanical units serving as multiple modules, a robot control device that controls the robot, and a memory provided in each of the mechanical units. In the memory, a shape model and a parameter for estimating the coasting distance of the robot are stored beforehand, the shape model indicating the shape of the mechanical unit.

8 Claims, 5 Drawing Sheets

(56) References Cited

U.S. PATENT DOCUMENTS

| | | | |
|---|---|---|---|
| 2011/0060462 A1* | 3/2011 | Aurnhammer | B25J 9/1674 |
| | | | 700/255 |
| 2011/0224826 A1* | 9/2011 | Maehara | B25J 9/1676 |
| | | | 700/255 |
| 2017/0348856 A1* | 12/2017 | Nakaya | B25J 9/06 |

FOREIGN PATENT DOCUMENTS

| | | |
|---|---|---|
| CN | 201552574 U | 8/2010 |
| CN | 101888920 A | 11/2010 |
| CN | 102189552 A | 9/2011 |
| JP | H05-004181 A | 1/1993 |
| JP | H09-285990 A | 11/1997 |
| JP | 2005-081445 A | 3/2005 |
| JP | 3910134 B2 | 4/2007 |
| JP | 2009-178842 A | 8/2009 |
| JP | 2012-056026 A | 3/2012 |

\* cited by examiner

ROBOT SYSTEM THAT CONTROLS ROBOT INCLUDING MULTIPLE MECHANICAL UNITS, THE MECHANICAL UNITS, AND ROBOT CONTROL DEVICE

RELATED APPLICATIONS

The present application claims priority to Japanese Patent Application No. 2016-060931 filed Mar. 24, 2016, the disclosures of which is hereby incorporated by reference herein in its entirety.

BACKGROUND OF THE INVENTION

1. Field of the Invention

The present invention relates to a robot system that controls a robot including multiple mechanical units such as a link unit and a driving unit for driving the link unit, the mechanical units, and a robot control device.

2. Description of the Related Art

Generally, industrial robots used at manufacturing sites are articulated type robots. To facilitate replacement in the event of a failure or during maintenance, such an articulated type robot includes multiple mechanical units such as a link unit (arm unit) and a driving unit for driving the link unit.

Moreover, a safety fence at a manufacturing site serves as a partition between a robot workspace and a human workspace. This prevents a person from accidentally touching a robot. By using a teach pendant connected to a robot control device, a robot is taught to operate, for example, a robot arm unit along a desired path of movement without being deviated out of the safety fence.

However, at some manufacturing sites, a workspace cannot be divided into a robot workspace and a human workspace or productivity may be considerably reduced by dividing a workspace. Such a manufacturing site requires a practical robot system that eliminates the need for a safety fence.

Thus, a virtual area for limiting the motion of a robot (Hereinafter, referred to as a motion limiting area) is preset in the related art. A robot entering the set virtual area for limiting a motion is controlled to stop. A motion program for the control of the robot is created by teaching the robot. If the configuration of the robot is changed by replacing mechanical units such as a link unit and a driving unit, a robot motion program stored in a robot control device needs to be changed. To automatically change programs, Japanese Patent No. 3910134 discloses a technique in which a memory is provided in a replaceable mechanical unit to store a parameter for robot trajectory control.

In order to stop a robot entering the virtual motion limiting area, a 3D model of the robot needs to be created and interference between the 3D model and the virtual motion limiting area needs to be confirmed during teaching to the robot. However, Japanese Patent No. 3910134 does not describe required storage of a 3D model of a robot.

Thus, a robot control device disclosed in Japanese Patent No. 3910134 cannot confirm whether or not a 3D model of a robot interferes with a virtual motion limiting area if the configuration of the robot is changed by replacing a mechanical unit. In order to confirm interference, a 3D model of the robot needs to be manually set for the robot control device and needs to be manually changed in the replacement of the mechanical unit of the robot.

Moreover, in response to the replacement of the mechanical unit of the robot, the robot control device disclosed in Japanese Patent No. 3910134 cannot automatically change a parameter for estimating a coasting distance when the robot is stopped.

SUMMARY OF THE INVENTION

The present invention provides a robot system in which a 3D model of a robot and a parameter for estimating a coasting distance are automatically changed for a robot control device when replaceable mechanical units in the robot are changed, the mechanical units, and the robot control device.

According to a first aspect of the present disclosure, a robot system is provided with: a robot including a combination of mechanical units serving as multiple modules; a robot control device that controls the robot; and a memory provided in each of the mechanical units, wherein a shape model and a parameter for estimating a coasting distance are stored beforehand in the memory, the shape model indicating the shape of the mechanical unit, the coasting distance being determined according to a motion speed of the robot, and the shape model and the parameter for estimating a coasting distance in the memory of the mechanical unit are read by the robot control device.

A second aspect of the present disclosure, according to the robot system of the first aspect, provides a robot system in which the robot control device includes:

a unit position acquisition unit that acquires the position of the mechanical unit;

a robot model generation unit that generates a 3D model of the robot based on the position of the mechanical unit, the position being acquired by the unit position acquisition unit, and the shape model stored in the memory of the mechanical unit;

a setting unit that sets a motion limiting area of the robot; and an interference confirmation unit that confirms whether or not the 3D model of the robot interferes with the motion limiting area, wherein if the interference confirmation unit confirms that the 3D model of the robot interferes with the motion limiting area, power to the robot is cut off or the motion speed of the robot is limited.

A third aspect of the present disclosure, according to the robot system of the second aspect, provides a robot system in which the robot control device further includes:

a coasting distance calculation unit that calculates a coasting distance of the mechanical unit based on the position and motion speed of the mechanical unit and the parameter for estimating a coasting distance, the position being acquired by the unit position acquisition unit, the parameter being stored in the memory of the mechanical unit; and an occupied area calculation unit that calculates an occupied area covering a virtual space until the 3D model of the coasting robot is stopped, based on the calculated coasting distances of the mechanical units, wherein if the interference confirmation unit confirms that the occupied area calculated by the occupied area calculation unit interferes with the motion limiting area, power to the robot is cut off or the motion speed of the robot is limited.

A fourth aspect of the present disclosure, according to the robot system of the second or third aspect, provides a robot system that includes a display unit that displays the 3D model of the robot and the motion limiting area.

A fifth aspect of the present disclosure provides a mechanical unit serving as a module constituting a robot, the mechanical unit including a memory in which a shape model and a parameter for estimating a coasting distance are stored, the shape model indicating the shape of the mechanical unit, the coasting distance being determined according to the motion speed of the robot.

According to a sixth aspect of the present disclosure, a robot control device that includes a combination of mechanical units serving as multiple modules, the robot control device controlling a robot including a memory in each of the mechanical units, wherein a shape model and a parameter for estimating a coasting distance are stored beforehand in the memory, the shape model indicating the shape of the mechanical unit, the coasting distance being determined according to a motion speed of the robot, and the shape model and the parameter for estimating a coasting distance in the memory of the mechanical unit are read.

A seventh aspect of the present disclosure, according to the robot control device of the sixth aspect, provides a robot control device including a unit position acquisition unit that acquires the position of the mechanical unit;

a robot model generation unit that generates a 3D model of the robot based on the position of the mechanical unit, the position being acquired by the unit position acquisition unit, and the shape model stored in the memory of the mechanical unit;

a setting unit that sets the motion limiting area of the robot; and an interference confirmation unit that confirms whether or not the 3D model of the robot interferes with the motion limiting area, wherein if the interference confirmation unit confirms that the 3D model of the robot interferes with the motion limiting area, power to the robot is cut off or the motion speed of the robot is limited.

An eighth aspect of the present disclosure, according to the robot control device of the seventh aspect, provides a robot control device further including a coasting distance calculation unit that calculates a coasting distance of the mechanical unit based on the position and motion speed of the mechanical unit and the parameter for estimating a coasting distance, the position being acquired by the unit position acquisition unit, the parameter being stored in the memory of the mechanical unit; and an occupied area calculation unit that calculates an occupied area covering a virtual space until the 3D model of the coasting robot is stopped, based on the calculated coasting distances of the mechanical units, wherein if the interference confirmation unit confirms that the occupied area calculated by the occupied area calculation unit interferes with the motion limiting area, power to the robot is cut off or the motion speed of the robot is limited.

A ninth aspect of the present disclosure, according to the robot control device of the seventh or eighth aspect, provides a robot control device including a display unit that displays the 3D model of the robot and the motion limiting area.

BRIEF DESCRIPTION OF THE DRAWINGS

A detailed description about a typical embodiment of the present disclosure shown in the accompanying drawings further clarifies the object, characteristics, advantages of the present invention and other objects, characteristics, and advantages of the present invention.

DETAILED DESCRIPTION

Figure 1:
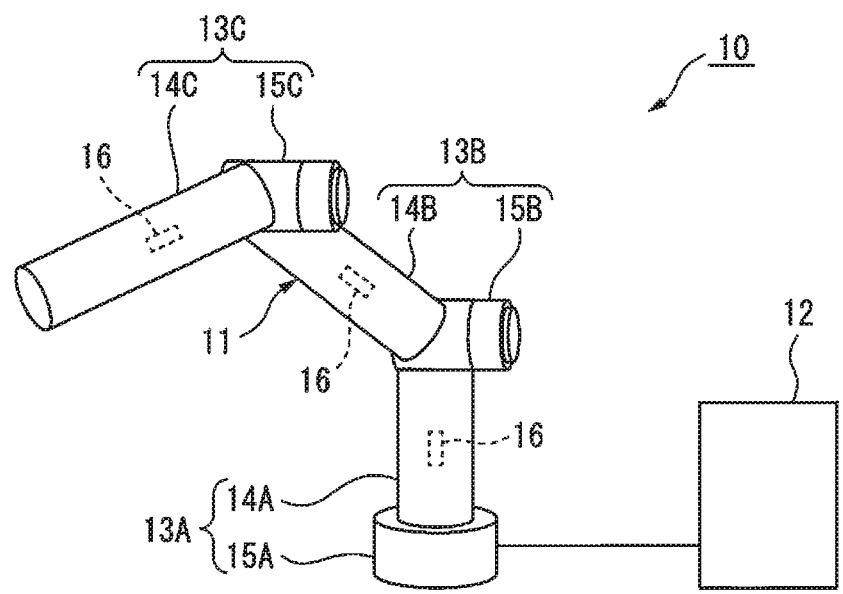
FIG. 1 schematically shows the configuration of a robot system according to an embodiment.

An embodiment of the present disclosure will be described below with reference to the accompanying drawings. In the drawings, the same members are indicated by the same reference numerals. Constituent elements indicated by the same reference numerals in different drawings have the same functions. The scale of the drawings is optionally changed to enhance understanding of the invention.

FIG. 1 schematically shows the configuration of a robot system 10 according to an embodiment.

As shown in FIG. 1, the robot system 10 of the present embodiment includes a robot 11, a robot control device 12 that controls the robot 11, and nonvolatile memories 16 respectively provided in replaceable mechanical units 13A to 13C that constitute the robot 11.

The robot 11 is, for example, a human-friendly robot that cooperates with a person at a manufacturing site. The robot 11 is also an articulated type robot including the three combined mechanical units 13A to 13C. The three mechanical units 13A to 13C constitute the robot 11 in the present embodiment but the number of mechanical units is not limited in the present invention.

The first mechanical unit 13A includes a first link unit 14A and a first driving unit 15A that drives the first link unit 14A. The second mechanical unit 13B includes a second link unit 14B and a second driving unit 15B that drives the second link unit 14B. The third mechanical unit 13C includes a third link unit 14C and a third driving unit 15C that drives the third link unit 14C. The link units 14A to 14C and the driving units 15A to 15C are configured as individual modules. The present invention is not limited to this configuration. Each of the mechanical units 13A to 13C may be configured as a single module having a link unit and a driving unit for driving the link unit.

With this configuration, a unit replacement or a structural change can be made by a user in each of the mechanical units 13A to 13C, the link units 14A to 14C, and the driving units 15A to 15C. The link units 14A to 14C and the driving units 15A to 15C may be also called arm units and joint units, respectively.

The robot 11 is connected to the robot control device 12 via a communication cable. The robot control device 12 includes a memory, e.g., a ROM or a RAM, a CPU, and a communication control unit (not shown). The communication control unit controls exchange of signals with each shaft motor (not shown) of the robot 11. For machining by the robot 11, a machining tool (not shown), e.g., a welding gun or an end mill is attached to the free end of the third link unit 14C of the robot 11. The robot control device 12 transmits motion commands about a speed, a position, a torque, and so on to the motors included in the respective driving units 15A to 15C of the robot 11. The link units 14A to 14C are operated according to the motion commands, moving the machining tool on the free end of the third link unit 14C along the path of movement according to the motion commands.

Figure 2:
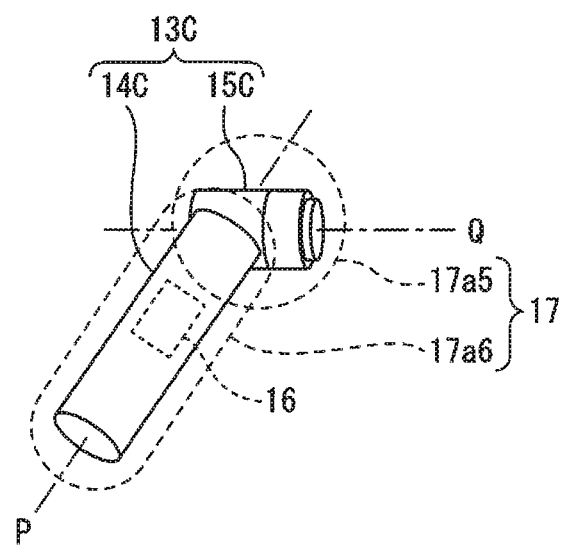
FIG. 2 schematically shows a mechanical unit including a memory.

Moreover, in the mechanical units 13A to 13C, the memory 16 is provided in each of the link units 14A to 14C and the driving units 15A to 15C. For example, if the mechanical unit 13C is configured as a module including the link unit 14C and the driving unit 15C, the memory 16 may be provided only in one of the link unit 14C and the driving unit 15C. FIG. 2 schematically shows the mechanical unit 13C including the memory 16.

The memory 16 included in each of the link units 14A to 14C and the driving units 15A to 15C stores a shape model 17 indicating the unit shape of the link unit.

The shape model 17 is shaped like a sphere, a rectangular solid, or a cylinder or these shapes may be combined so as to contain the outside shape of each unit. In the example of FIG. 2, an area 17a6 and an area 17a5 (surrounded by broken lines in FIG. 2) that contain the link unit 14C and the driving unit 15C, respectively, correspond to the shape model 17. The area 17a6 is defined as a cylindrical area having a predetermined radius from a central axis P of the link unit 14C. The area 17a5 is defined as a spherical area having a predetermined radius from a point on a joint axis Q of the driving unit 15C. The point on the joint axis Q is, for example, an intersection point of the central axis P of the link unit 14C and the joint axis Q of the driving unit 15C.

If a robot hand or a machining tool is attached to the free end of the link unit 14C, the area 17a6 is preferably defined as an area containing the robot hand or the machining tool.

Figure 3:
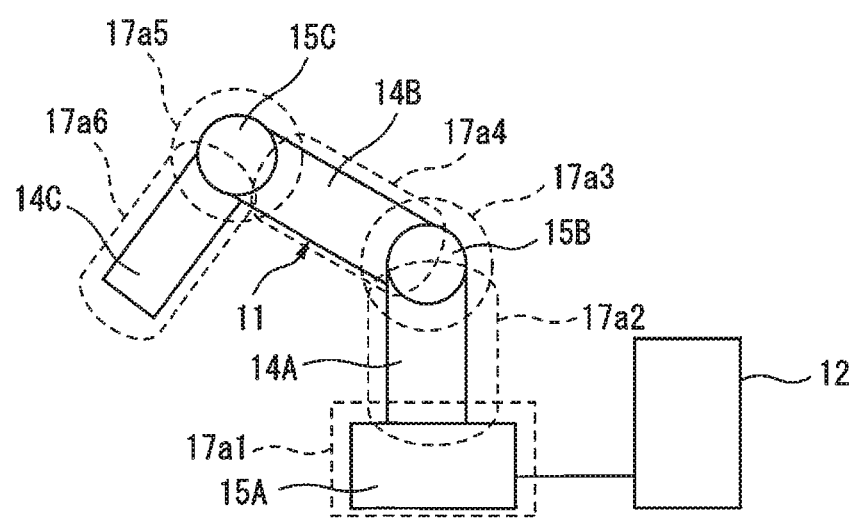
FIG. 3 schematically shows the shape models of all link units and driving units in a robot.

FIG. 3 schematically shows the shape models 17 of all the link units 14A to 14C and the driving units 15A to 15C in the robot 11. In FIG. 3, areas 17a1 to 17a4 and the areas 17a5 and 17a6 are equivalent to the shape models 17 of the units. Moreover, like the area 17a6, the areas 17a2 and 17a4 are defined as cylindrical areas having predetermined radii from the respective central axes of the link units 14B and 14A. Furthermore, like the area 17a5, the areas 17a1 and 17a3 are defined as spherical areas having predetermined radii from the respective points on the joint axes of the driving units 15B and 15A. The points on the joint axes are, as in the mechanical unit 13C (FIG. 2), an intersection point of the central axis of the link unit 14B and the joint axis of the driving unit 15B and an intersection point of the central axis of the link unit 14A and the joint axis of the driving unit 15A.

In the memory 16 of each unit, the definition of an area shape for the unit and numerical parameters for defining the area are stored as data on the shape model 17. The numerical parameters include the radii of the cylindrical and spherical areas and the axis length of the cylindrical area along the central axis. The cylindrical and spherical areas may have different predetermined radii if necessary.

The shape models 17 are preferably written in the memories 16 in the process of manufacturing or fixing the units including the link units 14A to 14C and the driving units 15A to 15C in a factory.

The functions and operations of the robot system 10 including the mechanical units 13A to 13C will be described below.

The mechanical units 13A to 13C (the link units 14A to 14C and the driving units 15A to 15C) are joined to one another to form the robot 11. At this point, electric wires used for control and power supply are also connected so as to exchange signals between the motor or the memory 16 in each unit with the robot control device 12.

After the robot control device 12 and the robot 11 are connected to each other, the robot control device 12 reads data on the shape models 17 stored in the memories 16 of the units. The data is read by starting the robot control device 12 connected to the robot 11. Alternatively, the data may be read in response to an instruction from a teach pendant connected to the robot control device 12.

After that, the robot control device 12 sequentially combines the shape models 17 acquired from the memories 16 of the units and generates a 3D model of the overall robot 11. For example, all the shape models 17 defined by the respective areas 17a1 to 17a6 in FIG. 3 are combined according to the positions and orientations of the units of the robots 11, thereby generating a 3D model of the overall robot 11.

Prior to the generation of a 3D model of the overall robot 11, an ID number for identifying the unit including the memory 16 is preferably written in the memory 16. Furthermore, the robot control device 12 at startup preferably reads an ID number in the memory of each unit and stores the ID number of each unit in a storage unit provided in the robot control device 12. Thus, for example, if the link unit 14B including the memory 16 is removed or replaced with another, the robot control device 12 at startup can recognize that an ID number corresponding to the link unit 14B has been omitted or changed. In other words, the robot control device 12 can detect a change of the unit configuration of the robot 11.

When detecting a change of the unit configuration, the robot control device 12 reads data on the shape models 17 in the memories 16 of the units and generates a new 3D model of the robot 11 based on the shape models 17.

Thus, if the replaceable mechanical units in the robot 11 are changed, the robot system 10 according to the present embodiment can automatically change a 3D model of the robot 11 for the robot control device 12.

If power to the driving circuit of the motor for driving the joint shafts of the robot 11 is cut off during an operation of the robot 11, the robot 11 may coast for a certain distance until the robot is stopped from the power cutoff. When a motion is taught to the robot 11 so as to prevent the robot 11 from entering a motion limiting area, the coasting distance is preferably taken into consideration.

Thus, a stop position of the shape model 17 in each unit of the coasted robot 11 is preferably estimated from a current position, a motion speed, and a motion direction of the shape model 17. An enlarged 3D model of the robot 11 is preferably generated so as to include the shape models 17 at the stop position and the current position. The generation of such a 3D model requires a parameter for estimating the coasting distance of each unit of the robot 11. This is because the coasting distance of each unit needs to be calculated to estimate the stop position of the shape model after coasting.

Hence, in addition to the shape model 17 of the corresponding unit, the parameter for estimating a coasting distance is stored beforehand in the memory 16 of each unit.

For example, the parameter for estimating a coasting distance is empirically determined and may be a proportional coefficient determined for the motion speed of the robot 11. The higher the motion speed of the robot 11, the longer the coasting distance of the robot 11. Thus, such a proportional coefficient is used as the parameter for estimating a coasting distance. In other words, the parameter for estimating a coasting distance is used for estimating a coasting distance determined according to the motion speed of the robot 11.

When detecting a change of the unit configuration according to the ID number, the control device 12 reads the parameter for estimating a coasting distance in the memory 16 of each unit along with data on the shape model 17. Specifically, when the replaceable mechanical units in the robot 11 are changed, the robot system 10 of the present embodiment can automatically change the parameter for estimating a coasting distance for the robot control device 12 as well as the shape models 17.

The robot control device 12 of the robot system 10 will be more specifically described below. In the following example, the memory 16 is included in each of the mechanical units 13A to 13C for the sake of description.

Figure 4:
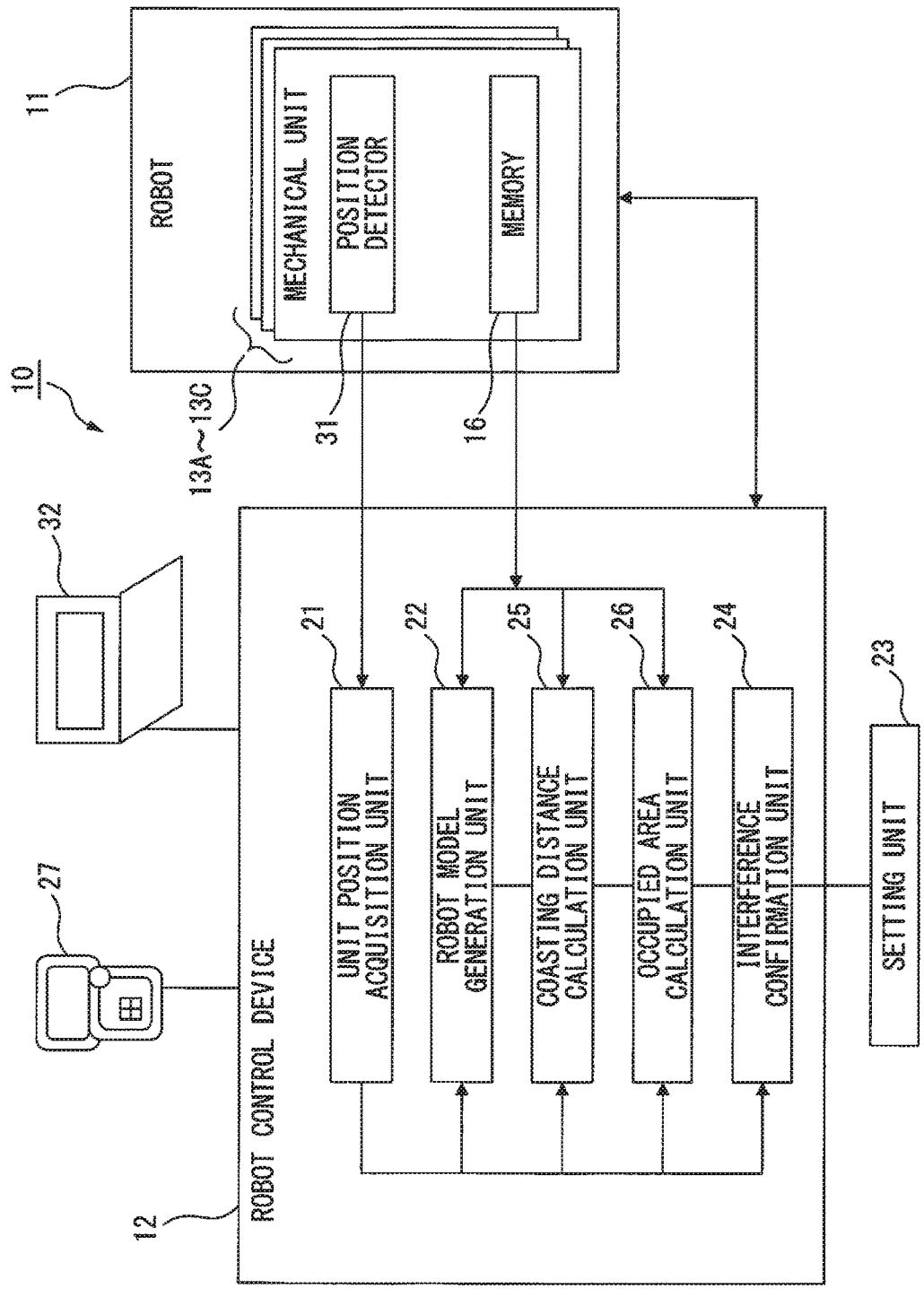
FIG. 4 is a block diagram showing the constituent elements of a robot control device in the robot system according to the embodiment.

FIG. 4 is a block diagram showing the constituent elements of the robot control device 12 in the robot system 10.

As shown in FIG. 4, the robot control device 12 of the present embodiment includes a unit position acquisition unit 21, a robot model generation unit 22, a setting unit 23, and an interference confirmation unit 24. The robot control device 12 preferably further includes a coasting distance calculation unit 25 and an occupied area calculation unit 26 as shown in FIG. 4. The present invention does not always need to include these constituent elements.

The unit position acquisition unit 21 acquires the positions of the mechanical units 13A to 13C of the robot 11 at predetermined intervals. The mechanical units 13A to 13C of the robot 11 include drive shafts (also called joint shafts) that are driven by the motors (not shown) in the respective driving units 15A to 15C to rotate the link units 14A to 14C.

Furthermore, the unit position acquisition unit 21 reads the angles of the drive shafts of the robot 11 at the predetermined intervals from position detectors 31, e.g., encoders disposed on the respective drive shafts, thereby acquiring the current position, orientation, motion speed, and motion direction of each of the mechanical units 13A to 13C.

The robot model generation unit 22 generates a 3D model of the robot 11 based on the positions of the mechanical units 13A to 13C, the positions being acquired by the unit position acquisition unit 21, and the shape models 17 stored in the memories 16 of the mechanical units 13A to 13C. Specifically, the shape models 17 in the memories 16 of the mechanical units 13A to 13C are sequentially combined based on the positions of the mechanical units 13A to 13C, thereby generating a 3D model of the robot 11. This also changes the appearance of the 3D model of the robot 11 in response to the motion command to the robot 11. In other words, the area position of the 3D model of the robot 11 varies according to a change of the positions and orientations of the mechanical units 13A to 13C of the robot 11.

The setting unit 23 has the function of setting the motion limiting area of the robot 11. For example, a user can set a motion limiting area, that is, an area where the user does not intend to operate the robot 11, by means of the setting unit 23. The setting unit 23 may include a teach pendant 27 that is connected to the robot control device 12 or an input unit, e.g., a touch panel or a keyboard included in a personal computer and so on. Data on the motion limiting area set by the setting unit 23 is inputted to the interference confirmation unit 24 and is stored therein.

The interference confirmation unit 24 confirms whether or not a 3D model of the robot 11 interferes with the motion limiting area set by the setting unit 23, the 3D model being generated by the robot model generation unit 22. If the interference confirmation unit 24 confirms that the 3D model of the robot 11 interferes with the motion limiting area, the robot control device 12 cuts off power to the robot 11 or limits the motion speed of the robot 11.

Figure 5:
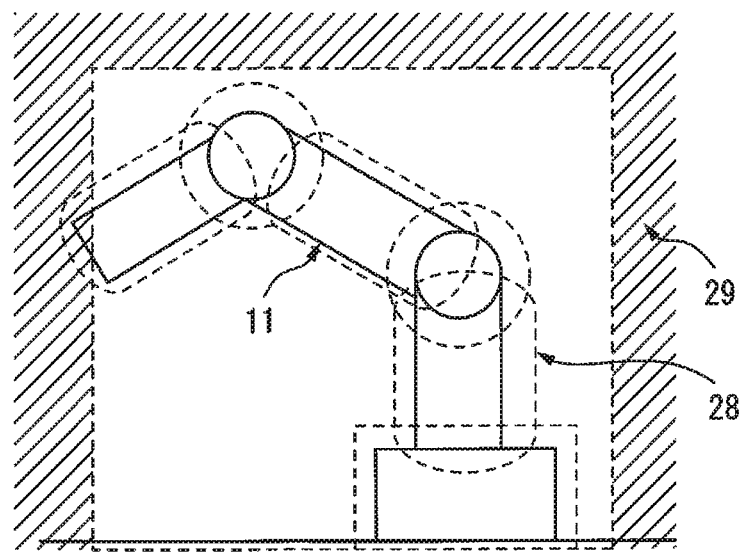
FIG. 5 schematically shows a 3D model and the motion limiting zone of the robot.

FIG. 5 schematically shows a 3D model and the motion limiting area of the robot 11. As shown in FIG. 5, the robot model generation unit 22 generates a 3D model 28 of the robot 11. The 3D model 28 is generated by combining all the areas 17a1 to 17a6 shown in FIG. 3. Moreover, a motion limiting area 29 (a shaded part in FIG. 5) of the robot 11 is set for the robot control device 12 by a user and a teaching operation is then performed on the robot 11. As shown in FIG. 5, if the 3D model 28 of the robot 11 interferes with the motion limiting area 29, for example, the robot control device 12 can stop the robot 11.

In the setting of the motion limiting area 29, in many cases, it is easier to specify an area where the robot 11 is permitted to enter, that is, a motion permission area than the definition of an area where the robot 11 is prohibited from entering. In this case, when the 3D model 28 moves out of the motion permission area, the robot control device 12 preferably cuts off power to the robot 11 to stop the robot 11.

The motion limiting area 29 or the motion permission area is preferably set when the robot 11 is installed or the mechanical units of the robot 11 are changed. For example, the motion limiting area 29 is defined as an external area of a rectangular solid as shown in FIG. 5. In this case, the coordinate values of a vertex of the rectangular parallelepiped are inputted as numeric values from the setting unit 23 to the interference confirmation unit 24 and are stored therein. The motion limiting area 29 or the motion permission area may be defined as multiple areas and the shape of the area is not limited to a rectangular solid.

Figure 6:
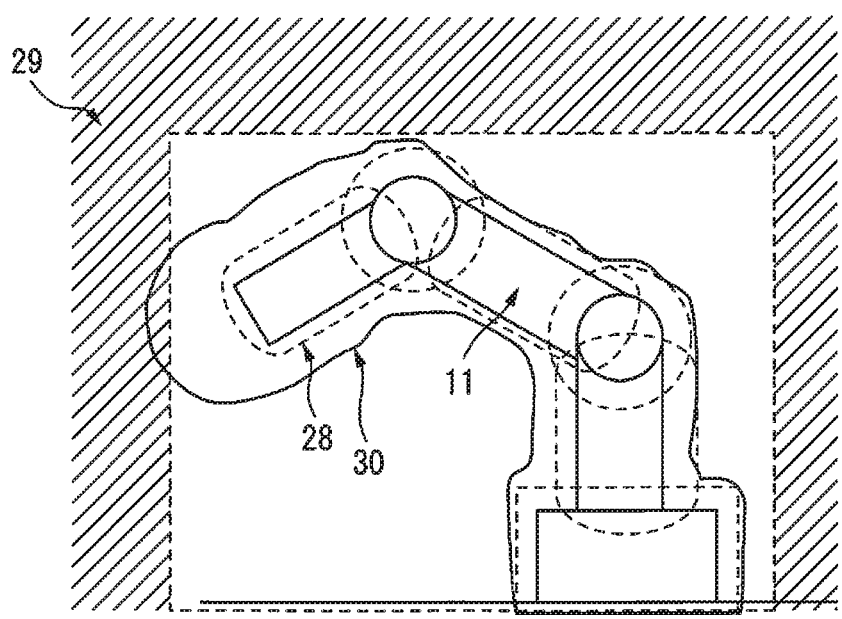
FIG. 6 schematically shows an occupied zone of a 3D model of the robot and the motion limiting zone if the robot coasts when being stopped.

FIG. 6 shows an occupied area 30 of a 3D model of the robot 11 and the motion limiting area 29 if the robot 11 coasts when being stopped.

Actually, even after power to the motor of the robot 11 is cut off, the shafts of the robot 11 slightly coast. Thus, the robot 11 coasted after power shutoff is stopped at a position deviated out of the set motion limiting area 29 by a coasting distance of the robot 11.

Hence, by using the parameter for estimating a coasting distance, the parameter being stored in the memory 16 of each unit, the robot control device 12 of the present embodiment preferably estimates the occupied area 30 covering a virtual space until the 3D model 28 of the coasting robot 11 is stopped as shown in FIG. 6. If the occupied area 30 interferes with the motion limiting area 29, the robot control device 12 preferably cuts off power to the robot 11 to stop the robot 11 or limits the motion speed of the robot 11.

For this reason, as shown in FIG. 4, the robot control device 12 includes the coasting distance calculation unit 25 and the occupied area calculation unit 26. The parameters for estimating the coasting distances of the respective mechanical units 13A to 13C are stored beforehand in the memories 16 of the mechanical units 13A to 13C that may be coasted after power to the robot 11 is cut off.

The coasting distance calculation unit 25 calculates the coasting distances of the respective mechanical units 13A to 13C based on the positions and motion speeds of the mechanical units 13A to 13C and the parameters for estimating the coasting distances in the memories 16 of the mechanical units. The positions of the mechanical units 13A to 13C are acquired by the unit position acquisition unit 21.

Based on the calculated coasting distances of the mechanical units 13A to 13C, the occupied area calculation unit 26 calculates the occupied area 30 covering a virtual space until the 3D model 28 of the coasting robot 11 is stopped.

For example, the occupied area calculation unit 26 estimates the stop positions of the shape models 17 of the coasted mechanical units 13A to 13C based on the current positions, the motion speeds, the motion directions, and the calculated coasting distances of the mechanical units 13A to 13C. Specifically, the stop position of the shape model after coasting is estimated by adding the calculated coasting distance to the current position of the shape model 17 in the motion direction of the shape model 17. Moreover, the occupied area calculation unit 26 determines the occupied area 30 of the 3D model of the robot 11 so as to include the shape models 17 at the stop position and a current position.

If the coasting distance calculation unit 25 and the occupied area calculation unit 26 are included in the robot control device 12, the interference confirmation unit 24 preferably confirms whether or not the occupied area 30 calculated by the occupied area calculation unit 26 interferes with the predetermined motion limiting area 29.

The robot control device 12 preferably includes a display unit 32 that provides graphic display of the 3D model 28, the motion limiting area 29, and the occupied area 30 of the robot 11. In other words, a user can teach the robot 11 while confirming interference between the 3D model 28 of the robot 11 and the motion limiting area 29 on the display unit 32. The display unit 32 may include a display panel provided on, for example, a host computer connected to the robot control device 12. A display screen provided on the teach pendant 27 may serve as the display unit 32.

Figure 7:
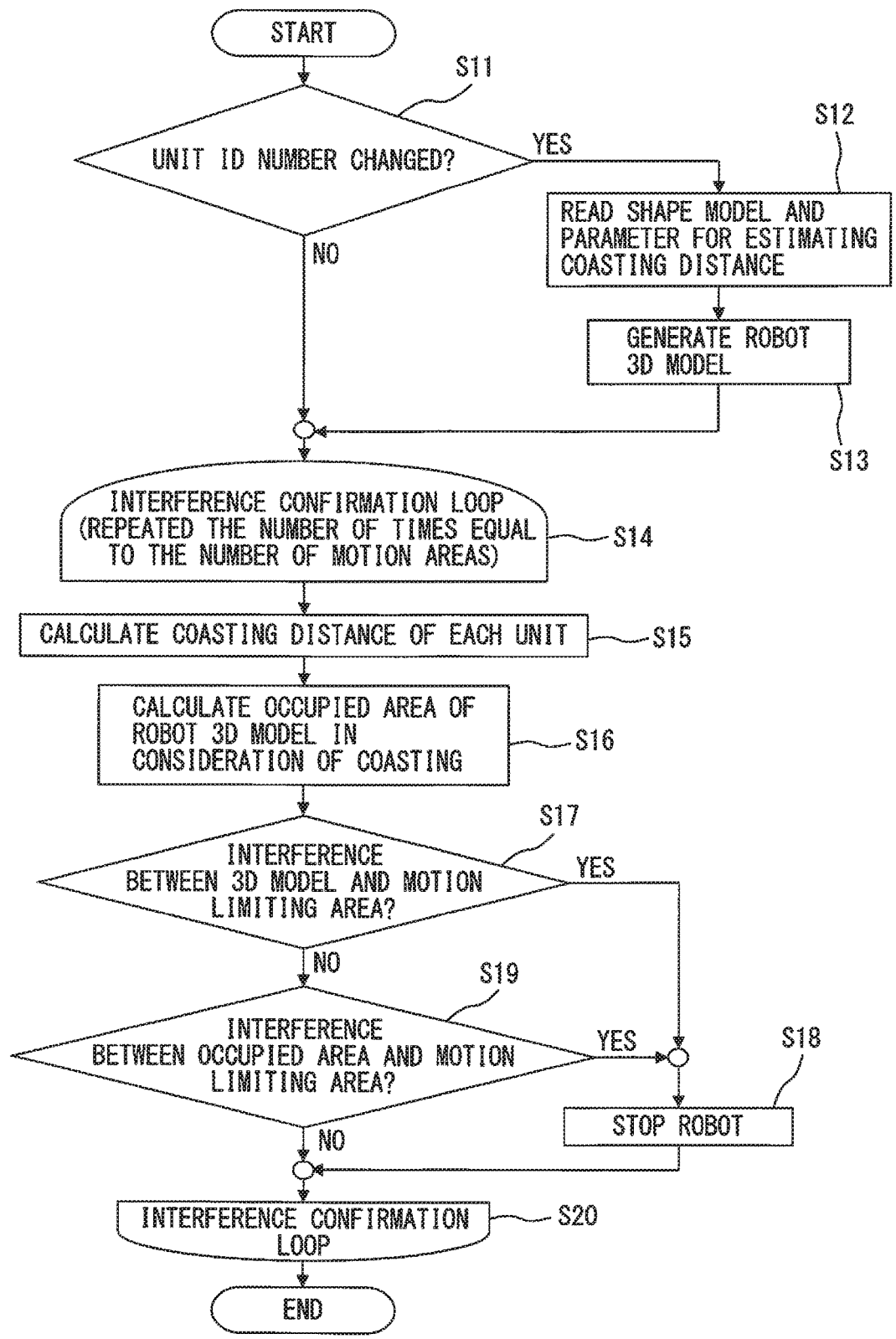
FIG. 7 is a flowchart for explaining an example of the operation flow of the robot system according to the embodiment.

FIG. 7 is a flowchart for explaining an example of a processing flow of the robot control device 12 shown in FIG. 4. Referring to FIG. 7, the operations of the robot control device 12 shown in FIG. 4 will be described below.

In step S11 of FIG. 7, the motion limiting area 29 is inputted to the interference confirmation unit 24 by the setting unit 23. In the memory 16 of each unit, the shape model 17 of the corresponding unit, the parameter for estimating a coasting distance, and an ID number are stored beforehand. In this case, "each unit" indicates each of the mechanical units 13A to 13C, the link units 14A to 14C, and the driving units 15A to 15C.

A user connects the units to assemble the robot 11, installs the robot 11, connects the robot 11 and the robot control device 12, and then starts the robot control device 12.

First, in step S11 of FIG. 7, the robot model generation unit 22 of the robot control device 12 reads an ID number in the memory 16 of each unit, allowing the robot control device 12 to confirm whether or not the ID number of each unit has been changed.

As a result of confirmation, if the ID number of each unit has not been changed, the process advances to step S14. If the ID number of each unit has been changed, in step S12, the robot model generation unit 22 reads data on the shape model 17 stored in the memory 16 of each unit and the parameter for estimating a coasting distance.

In step S13, the robot model generation unit 22 generates a 3D model of the robot 11 from the current positions of the units and the shape models 17 of the units. The current positions of the units are acquired by the unit position acquisition unit 21.

After that, in step S14, interference confirmation including steps S15 to S20 is repeated the number of times equal to the number of predetermined motion areas (operating areas). In other words, after step S13, interference is confirmed every time a user sequentially moves the ends of the robot 11 to the predetermined motion areas through the teach pendant 27 and so on.

Specifically, in step S15, the coasting distance calculation unit 25 of the robot control device 12 calculates the coasting distance of each unit based on the current position and motion speed of each unit and the parameter for estimating a coasting distance in the memory 16 of each unit.

Subsequently, in step S16, the occupied area calculation unit 26 of the robot control device 12 calculates the occupied area 30 of the 3D model of the robot 11 based on the calculated coasting distances of the units in consideration of coasting of the robot being stopped.

In step S17, the interference confirmation unit 24 of the robot control device 12 confirms whether or not the 3D model 28 of the robot 11 displaced based on the motion command interferes with the set motion limiting area 29. As a result of confirmation, if the 3D model 28 of the robot 11 interferes with the motion limiting area 29, the process advances to step S18. In step S18, the robot control device 12 stops the robot 11, and then the process advances to step S20. In step S17, if the 3D model 28 of the robot 11 displaced based on the motion command does not interfere with the motion limiting area 29, the process advances to step S19.

In step S19, the interference confirmation unit 24 confirms whether or not the calculated occupied area 30 of the 3D model and the set motion limiting area 29 interfere with each other. As a result of confirmation, if the calculated occupied area 30 of the 3D model interferes with the motion limiting area 29, the process advances to step S18. In step S18, the robot control device 12 stops the robot 11, and then the process advances to step S20. In step S19, if the calculated occupied area 30 of the 3D model does not interfere with the motion limiting area 29, the process advances to step S20.

After that, in step S20, if the interference confirmation is repeated the number of times equal to the number of desired motion areas, the operations of the robot control device 12 are completed.

As described above, when the configuration of the robot 11 is changed by replacing the units, the robot control device 12 of the present embodiment acquires the shape models 17 stored in the memories 16 of the units 11, thereby automatically generating the 3D model 28 of the robot. If the 3D model 28 of the robot interferes with the virtual motion limiting area 29 when the robot control device 12 operates the robot 11, power to the robot 11 can be cut off or the motion speed of the robot 11 can be limited.

Moreover, the robot control device 12 of the present embodiment can calculate the occupied area 30 of the 3D model of the robot 11 in consideration of a coasting distance of the robot 11 until the robot 11 is stopped after power to the operated robot 11 is cut off. Furthermore, whether or not the 3D model of the robot interferes with the motion limiting area can be confirmed using the occupied area 30 of the 3D model in consideration of the coasting distance, allowing a user to plan a safer path of movement and teach the robot 11 the path.

The present invention was described above according to the typical embodiment. A person skilled in the art could understand that the embodiment can be changed and various other changes, omissions, and additions may be made without departing from the scope of the present invention. The foregoing embodiments may be combined within the scope of the present invention.

According to one aspect of the present disclosure, if the replaceable mechanical units of the robot are changed, the 3D model of the robot and the parameter for estimating a coasting distance can be automatically changed for the robot control device.

According to another aspect of the present disclosure, if the configuration of the robot is changed by replacing the mechanical units, the robot control device can acquire the shape models of the mechanical units and automatically generate the 3D model of the overall robot, the shape models being stored in the memories. If the 3D model of the robot interferes with a virtual motion limiting area when the robot control device operates the robot, power to the robot can be cut off or the motion speed of the robot can be limited.

According to other eight aspects of the present disclosure, the occupied area of the 3D model of the robot can be calculated in consideration of a coasting distance of the robot until the robot is stopped after power to the operated robot is cut off. Furthermore, whether or not the 3D model of the robot interferes with the motion limiting area can be confirmed using the occupied area of the 3D model in consideration of a coasting distance, allowing a user to plan a safer path of movement and teach the robot the path.

According to another aspect of the present disclosure, a user can teach the robot while confirming interference between the 3D model of the robot and the motion limiting zone on the display unit.

The invention claimed is:

1. A robot system comprising:
   a robot including a combination of mechanical units serving as multiple modules;
   a robot control device that controls the robot; and
   a memory provided in each of the mechanical units,
   wherein a shape model and a parameter for estimating a coasting distance are stored beforehand in the memory, the shape model indicating a shape of the mechanical unit, the coasting distance being determined according to a motion speed of the robot, and
   the shape model and the parameter for estimating a coasting distance in the memory of the mechanical unit are read by the robot control device.

2. The robot system according to claim 1, wherein the robot control device comprises:
   a unit position acquisition unit that acquires a position of the mechanical unit;
   a robot model generation unit that generates a 3D model of the robot based on the position of the mechanical unit, the position being acquired by the unit position acquisition unit, and the shape model stored in the memory of the mechanical unit;
   a setting unit that sets a motion limiting area of the robot; and
   an interference confirmation unit that confirms whether or not the 3D model of the robot interferes with the motion limiting area,
   wherein if the interference confirmation unit confirms that the 3D model of the robot interferes with the motion limiting area, power to the robot is cut off or the motion speed of the robot is limited.

3. The robot system according to claim 2, wherein the robot control device further comprises:
   a coasting distance calculation unit that calculates a coasting distance of the mechanical unit based on the position and motion speed of the mechanical unit and the parameter for estimating a coasting distance, the position being acquired by the unit position acquisition unit, the parameter being stored in the memory of the mechanical unit; and
   an occupied area calculation unit that calculates an occupied area covering a virtual space until the 3D model of the coasting robot is stopped, based on the calculated coasting distances of the mechanical units,
   wherein if the interference confirmation unit confirms that the occupied area calculated by the occupied area calculation unit interferes with the motion limiting area, power to the robot is cut off or the motion speed of the robot is limited.

4. The robot system according to claim 2, further comprising a display unit that displays the 3D model of the robot and the motion limiting area.

5. A robot control device that includes a combination of mechanical units serving as multiple modules, the robot control device controlling a robot including a memory in each of the mechanical units,
   wherein a shape model and a parameter for estimating a coasting distance are stored beforehand in the memory, the shape model indicating a shape of the mechanical unit, the coasting distance being determined according to a motion speed of the robot, and
   the shape model and the parameter for estimating a coasting distance in the memory of the mechanical unit are read.

6. The robot control device according to claim 5, further comprising a unit position acquisition unit that acquires a position of the mechanical unit;
   a robot model generation unit that generates a 3D model of the robot based on the position of the mechanical unit, the position being acquired by the unit position acquisition unit, and the shape model stored in the memory of the mechanical unit;
   a setting unit that sets a motion limiting area of the robot; and
   an interference confirmation unit that confirms whether or not the 3D model of the robot interferes with the motion limiting area,
   wherein if the interference confirmation unit confirms that the 3D model of the robot interferes with the motion limiting area, power to the robot is cut off or the motion speed of the robot is limited.

7. The robot control device according to claim 6, further comprising a coasting distance calculation unit that calculates a coasting distance of the mechanical unit based on the position and motion speed of the mechanical unit and the parameter for estimating a coasting distance, the position being acquired by the unit position acquisition unit, the parameter being stored in the memory of the mechanical unit; and
   an occupied area calculation unit that calculates an occupied area covering a virtual space until the 3D model of the coasting robot is stopped, based on the calculated coasting distances of the mechanical units,
   wherein if the interference confirmation unit confirms that the occupied area calculated by the occupied area calculation unit interferes with the motion limiting area, power to the robot is cut off or the motion speed of the robot is limited.

8. The robot control device according to claim 6, comprising a display unit that displays the 3D model of the robot and the motion limiting area.

* * * * *